United States Patent
Ham et al.

(10) Patent No.: US 12,462,348 B2
(45) Date of Patent: Nov. 4, 2025

(54) MULTIMODAL DIFFUSION MODELS

(71) Applicant: ADOBE INC., San Jose, CA (US)

(72) Inventors: Cusuh Ham, Marietta, GA (US);
Tobias Hinz, Campbell, CA (US);
Jingwan Lu, Sunnyvale, CA (US);
Krishna Kumar Singh, San Jose, CA (US); Zhifei Zhang, San Jose, CA (US)

(73) Assignee: ADOBE INC., San Jose, CA (US)

( * ) Notice: Subject to any disclaimer, the term of this patent is extended or adjusted under 35 U.S.C. 154(b) by 377 days.

(21) Appl. No.: 18/165,141

(22) Filed: Feb. 6, 2023

(65) Prior Publication Data

US 2024/0265505 A1 Aug. 8, 2024

(51) Int. Cl.
*G06T 5/70* (2024.01)

(52) U.S. Cl.
CPC ...... *G06T 5/70* (2024.01); *G06T 2207/20081* (2013.01); *G06T 2207/20084* (2013.01)

(58) Field of Classification Search
CPC ...... G06V 10/82; G06T 5/20; G06T 2207/20081; G06N 3/0455; G06N 3/0464; G06N 3/08; G06N 3/0442
See application file for complete search history.

(56) References Cited

U.S. PATENT DOCUMENTS

| | | | | |
|---|---|---|---|---|
| 11,393,166 B2 * | 7/2022 | Wei | | G06T 17/10 |
| 11,908,180 B1 * | 2/2024 | Ho | | G06V 10/82 |
| 12,020,403 B2 * | 6/2024 | Kulkarni | | G06T 5/50 |
| 12,067,659 B2 * | 8/2024 | Wang | | G06T 7/20 |
| 12,148,119 B2 * | 11/2024 | Zhang | | G06N 3/04 |
| 12,169,850 B1 * | 12/2024 | Luguev | | G06Q 30/0253 |
| 2019/0251721 A1 * | 8/2019 | Hua | | G06N 3/088 |
| 2022/0067281 A1 * | 3/2022 | Hu | | G06F 40/30 |
| 2022/0335285 A1 * | 10/2022 | Sundaresan | | G06N 3/063 |
| 2023/0109379 A1 * | 4/2023 | Kreis | | G06T 5/70 |
| | | | | 382/157 |
| 2023/0162413 A1 * | 5/2023 | Batra | | G06T 7/11 |
| | | | | 345/441 |
| 2023/0377214 A1 * | 11/2023 | Kansy | | G06V 10/82 |
| 2024/0037948 A1 * | 2/2024 | Chen | | G06V 20/46 |
| 2024/0346629 A1 * | 10/2024 | Harikumar | | G06T 5/73 |

(Continued)

OTHER PUBLICATIONS

Mao, Jiafeng, Xueting Wang, and Kiyoharu Aizawa. "Guided image synthesis via initial image editing in diffusion model." Proceedings of the 31st ACM International Conference on Multimedia. 2023. (Year: 2023).*

(Continued)

*Primary Examiner* — Andrae S Allison
(74) *Attorney, Agent, or Firm* — F. CHAU & ASSOCIATES, LLC

(57) ABSTRACT

Systems and methods for image processing are described. Embodiments of the present disclosure obtain a noise image and guidance information for generating an image. A diffusion model generates an intermediate noise prediction for the image based on the noise image. A conditioning network generates noise modulation parameters. The intermediate noise prediction and the noise modulation parameters are combined to obtain a modified intermediate noise prediction. The diffusion model generates the image based on the modified intermediate noise prediction, wherein the image depicts a scene based on the guidance information.

20 Claims, 14 Drawing Sheets

(56) References Cited

U.S. PATENT DOCUMENTS

2025/0005809 A1* 1/2025 Kim .................. G06F 40/279
2025/0005829 A1* 1/2025 Kim .................. G06T 11/60

OTHER PUBLICATIONS

Rombach, Robin, et al. "High-resolution image synthesis with latent diffusion models." Proceedings of the IEEE/CVF conference on computer vision and pattern recognition. 2022. (Year: 2022).*

Hertz, Amir, et al. "Prompt-to-prompt image editing with cross attention control." arXiv preprint arXiv:2208.01626 (2022). (Year: 2022).*

Voynov et al, Sketch-Guided Text-to-Image Diffusion Models, Sketch-Guided Text-to-Image Diffusion Models, https://arxiv.org/abs/2211.13752 Nov. 2022 (Year: 2022).*

Valevski et al, UniTune: Text-Driven Image Editing by Fine Tuning an Image Generation Model on a Single Image, https://arxiv.org/abs/2210.09477v3, 2022 (Year: 2022).*

1Gafni, et al., "Make-A-Scene: Scene-Based Text-to-Image Generation with Human Priors", arXiv preprint arXiv:2203.13131v1 [cs.CV] Mar. 24, 2022, 17 pages.

2Gatys, et al., "A Neural Algorithm of Artistic Style", arXiv preprint arXiv:1508.06576v2 [cs.CV] Sep. 2, 2015, 16 pages.

3Huang, et al., "Multimodal Conditional Image Synthesis with Product-of-Experts GANs", arXiv preprint arXiv:2112.05130v1 [cs.CV] Dec. 9, 2021, 18 pages.

4Liu, et al., "More Control for Free! Image Synthesis with Semantic Diffusion Guidance", arXiv preprint arXiv:2112.05744v2 [cs.CV] Dec. 14, 2021, 16 pages.

5Nichol, et al., "GLIDE: Towards Photorealistic Image Generation and Editing with Text-Guided Diffusion Models", arXiv preprint arXiv:2112.10741v3 [cs.CV] Mar. 8, 2022, 20 pages.

6Ramesh, et al., "Hierarchical Text-Conditional Image Generation with CLIP Latents", arXiv preprint arXiv:2204.06125v1 [cs.CV] Apr. 13, 2022, 27 pages.

7Rombach, et al., "High-Resolution Image Synthesis with Latent Diffusion Models", arXiv preprint arXiv:2112.10752v2 [cs.CV] Apr. 13, 2022, 45 pages.

8Saharia, et al., "Photorealistic Text-to-Image Diffusion Models with Deep Language Understanding", arXiv preprint arXiv:2205.11487v1 [cs.CV] May 23, 2022, 46 pages.

9Song, et al., "Denoising Diffusion Implicit Models", arXiv preprint arXiv:2010.02502v4 [cs.LG] Oct. 5, 2022, 22 pages.

10Zhang, et al. "The Unreasonable Effectiveness of Deep Features as a Perceptual Metric", In CVPR, arXiv preprint arXiv:1801.03924v1 [cs.CV] Jan. 11, 2018, 14 pages.

* cited by examiner

MULTIMODAL DIFFUSION MODELS

BACKGROUND

The following relates generally to machine learning, and more specifically to machine learning for image generation. Digital image processing refers to the use of a computer to edit a digital image using an algorithm or a processing network. In some cases, image processing software can be used for various image processing tasks, such as image editing, image restoration, image generation, etc. Some image processing systems may implement machine learning techniques, for example, to perform tasks using predictive models (e.g., without explicitly programing the system for each task), to perform tasks with more accuracy or in less time, to perform tasks using special-purpose hardware, etc.

Image generation (a subfield of digital image processing) includes the use of a machine learning model to generate images. Diffusion-based models are one category of machine learning models that can be used to generate images. Specifically, diffusion models can be trained to take random noise as input and generate new images with features similar to the training data.

SUMMARY

The present disclosure describes systems and methods for image processing. Embodiments of the present disclosure include an image processing apparatus configured to receive an image and guidance information as input and generate an output image based on the guidance information. A conditioning network is trained such that it can condition a pre-trained diffusion model based on a variety of modalities other than text. Specifically, the conditioning network receives segmentation, sketch, style guidance as input and computes noise modulation parameters to guide the reverse denoising process of the diffusion model. An intermediate noise prediction at each time step is modified based on the noise modulation parameters accordingly. The present disclosure enables different types of control other than text and avoids retraining the diffusion model for each modality.

A method, apparatus, and non-transitory computer readable medium for image processing are described. One or more embodiments of the method, apparatus, and non-transitory computer readable medium include obtaining a noise image and guidance information for generating an image; generating an intermediate noise prediction for the image based on the noise image using a diffusion model; generating noise modulation parameters using a conditioning network; combining the intermediate noise prediction and the noise modulation parameters to obtain a modified intermediate noise prediction; and generating the image based on the modified intermediate noise prediction, wherein the image depicts a scene based on the guidance information.

A method, apparatus, and non-transitory computer readable medium for image processing are described. One or more embodiments of the method, apparatus, and non-transitory computer readable medium include initializing a conditioning network; obtaining training data comprising training guidance information and a ground-truth image depicting a scene based on the training guidance information; and training the conditioning network to modify predicted noise generated by a diffusion model, wherein the conditioning network is trained based on the training guidance information and the ground-truth image.

An apparatus and method for image processing are described. One or more embodiments of the apparatus and method include a processor; a memory including instructions executable by the processor; a diffusion model trained to generate images by iteratively generating intermediate noise predictions; and a conditioning network trained to generate noise modulation parameters that, when combined with the intermediate noise predictions, cause the diffusion model to generate the images based on guidance information.

DETAILED DESCRIPTION

Figure 1:
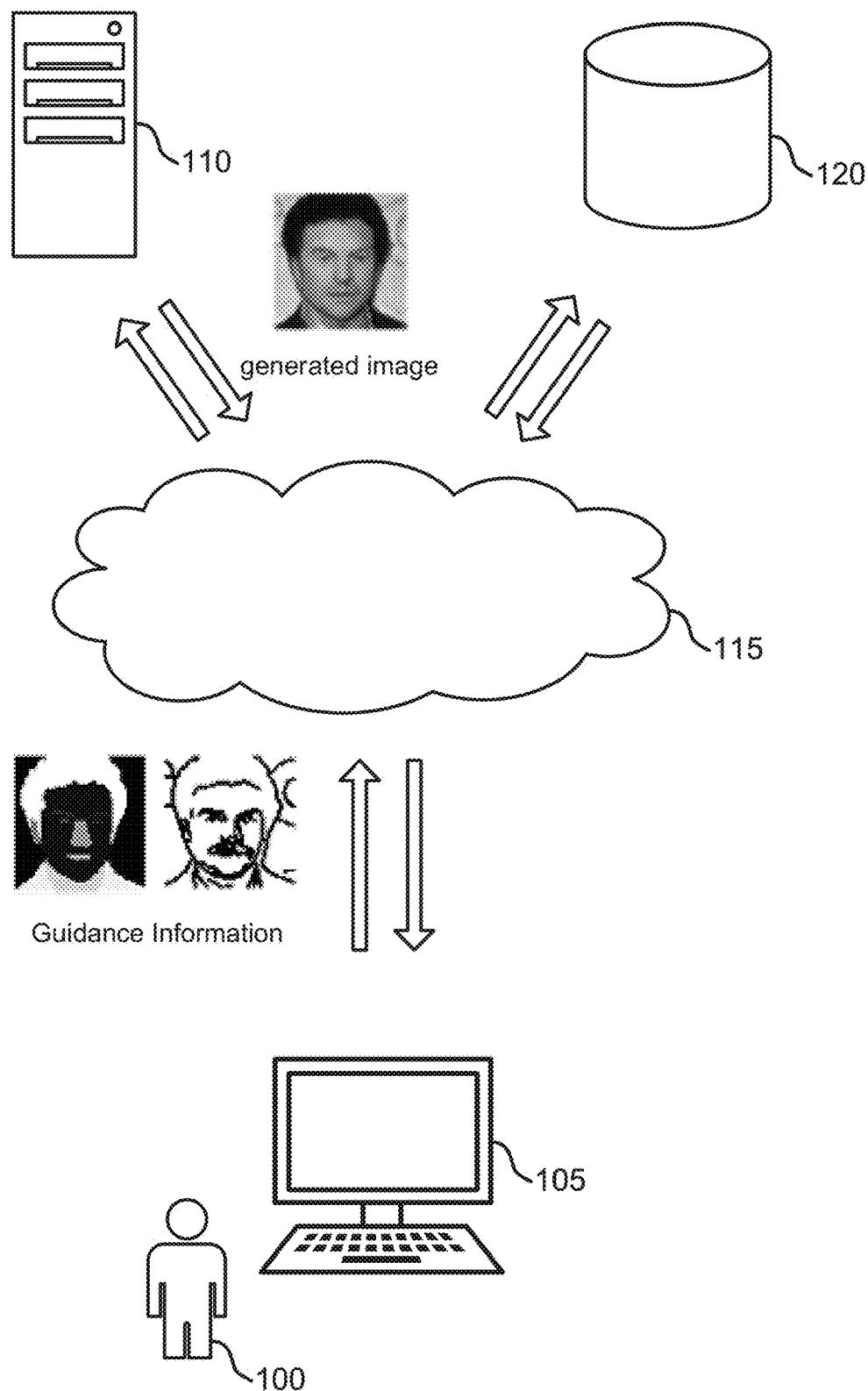
FIG. 1 shows an example of an image processing system according to embodiments of the present disclosure.

The present disclosure describes systems and methods for image processing. Embodiments of the present disclosure include an image processing apparatus configured to receive an image and guidance information as input and generate an output image based on the guidance information. A conditioning network is trained such that it can condition a pre-trained diffusion model based on a variety of modalities other than text. Specifically, the conditioning network receives segmentation, sketch, style guidance as input and computes noise modulation parameters to guide the reverse denoising process of the diffusion model. An intermediate noise prediction at each time step is modified based on the noise modulation parameters accordingly. The present disclosure enables different types of control other than text and avoids retraining the diffusion model for each modality.

Diffusion models are a class of generative neural networks that can be trained to generate new data with features similar to features found in training data. Diffusion models can be used in image completion tasks, such as image inpainting. In some examples, however, diffusion models may generate poor results when they are limited to taking only text information as a condition for image generation tasks. Conventional models have not incorporated non-textual guidance (e.g., diffusion models are limited to text modality as condition). However, text-conditioned models often fail to correctly capture the relationships and attributes in the text. Additionally, these models depend on a large amount of training data and require costly computation resources to retrain or fine-tune the diffusion model.

Embodiments of the present disclosure include an image processing apparatus configured to receive a noise image and guidance information that identifies a type of target control. The image processing apparatus then generates an output image that incorporates target control as indicated in the guidance information. A conditioning network is trained to guide a diffusion model based on the guidance information, where the diffusion model generates a denoised image.

The conditioning network is trained based on guidance information such as spatial layout, style information, structural information, etc. Specifically, semantic segmentation maps and sketch information indicate spatial layout. Style images indicate texture or color. The conditioning network is trained that conditions a diffusion model on one or more modalities. In some embodiments, the conditioning network takes a noise image, intermediate noise prediction, and guidance information as input and generates modulation parameters. The intermediate noise prediction and the noise modulation parameters are combined to obtain a modified intermediate noise prediction. The diffusion model generates a denoised image based on the modified intermediate noise prediction. The denoised image depicts a scene based on the guidance information.

Accordingly, by enabling the user to provide guidance information to a diffusion model, embodiments of the present disclosure enable users to generate images that accurately reflect a desired layout and style compared to conventional image generation models. This can reduce the time it takes for users to generate the desired output, as well as guide the model to produce more relevant output. Embodiments give users fine control over the desired attributes such as spatial arrangement or style in images generated by the diffusion model, while still allowing them to generate multiple versions of an image based on random inputs. In some cases, the diffusion model is pre-trained and does not require retraining. This saves computation resources and leads to relatively fast speed at inference time.

One or more embodiments combine a variety of modalities as guidance to condition a diffusion model. The present disclosure enables different types of control other than text and avoids retraining the diffusion model for each modality. Accordingly, generated images accurately capture relationships and attributes as intended by users.

Embodiments of the present disclosure can be used in the context of image generation applications. For example, an image processing network based on the present disclosure takes guidance information as input and efficiently generates an image that follows the guidance information. An example application, according to some embodiments, is provided with reference to FIG. 6. Details regarding the architecture of an example image processing apparatus are provided with reference to FIGS. 2-5. Example processes for image processing are provided with reference to FIGS. 6-11. Example training processes are described with reference to FIGS. 12-13.

By using a diffusion model based on noise that is generated from input guidance, embodiments of the present disclosure enable users to generate detailed images automatically that conform to desired parameters such as overall shape and structure. This enables faster and more efficient image generation compared to conventional image generation techniques, while still enabling users to generate a variety of image version using the diffusion process. In some cases, embodiments also enable users to select a degree to which the guidance is applied, which gives users even more power to generate a variety of desired outputs in less time and with better results than conventional methods.

Network Architecture

In FIGS. 1-5, an apparatus and method for image processing is described. One or more embodiments of the apparatus include a processor and a memory including instructions executable by the processor; a diffusion model trained to generate images by iteratively generating intermediate noise predictions; and a conditioning network trained to generate noise modulation parameters that, when combined with the intermediate noise predictions, cause the diffusion model to generate the images based on guidance information.

In some embodiments, the diffusion model comprises a U-Net architecture, wherein the noise modulation parameters are applied to an output of the U-Net architecture of the diffusion model. In some embodiments, the diffusion model comprises a text-guided diffusion model, and the diffusion model takes a text prompt as an input. In some embodiments, the conditioning network comprises a U-Net architecture, wherein the noise modulation parameters comprise an output of the U-Net architecture of the conditioning network.

FIG. 1 shows an example of an image processing system according to embodiments of the present disclosure. The example shown includes user 100, user device 105, image processing apparatus 110, cloud 115, and database 120. Image processing apparatus 110 is an example of, or includes aspects of, the corresponding element described with reference to FIG. 2.

As an example shown in FIG. 1, user 100 provides guidance information to image processing apparatus 110 via a user interface implemented on user device 105. The guidance information includes sketch information and segmentation information that indicate the desired structure and object segmentation to be generated. For example, the segmentation information includes a target segmentation map while the sketch information includes a sketch image depicting a scene. Image processing apparatus 110, via a conditioning network and a diffusion model, predicts an output image based on the guidance information.

Image processing apparatus 110 generates a high-quality output image that accurately captures the segmentation information and the sketch information. That is, the generated image is consistent with content, structure, and semantics from the guidance information. In the above example, the output image includes a face of a man that is in line with the structure, style, shape, etc as shown in the guidance information. Image processing apparatus 110 returns the output image to user 100 via cloud 115 and user device 105. The process of using image processing apparatus 110 is further described with reference to FIG. 6.

User device 105 may be a personal computer, laptop computer, mainframe computer, palmtop computer, personal assistant, mobile device, or any other suitable processing apparatus. In some examples, user device 105 includes software that incorporates an image processing application (e.g., an image editing application). The image editing application may either include or communicate with image processing apparatus 110. In some examples, the image editing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Image processing apparatus 110 includes a computer implemented network. Image processing apparatus 110 may also include a processor unit, a memory unit, an I/O module, and a training component. The training component is used to train a machine learning model (e.g., a diffusion model). Additionally, image processing apparatus 110 can communicate with database 120 via cloud 115. In some cases, the architecture of the image processing network is also referred to as a network or a network model. Further detail regarding the architecture of image processing apparatus 110 is provided with reference to FIGS. 2-5. Further detail regarding the operation of image processing apparatus 110 is provided with reference to FIGS. 6-11.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
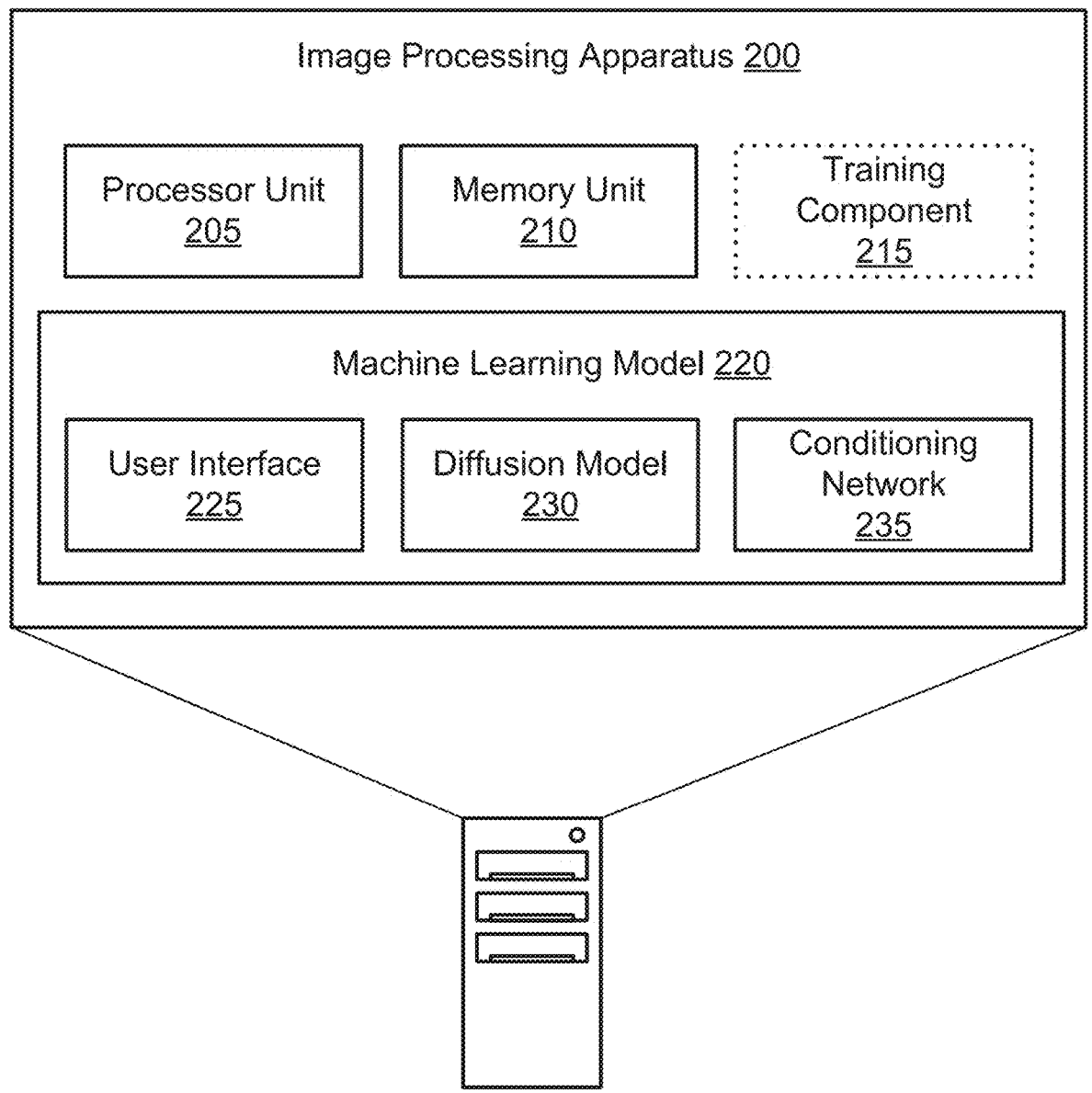
FIG. 2 shows an example of an image processing apparatus according to embodiments of the present disclosure.

FIG. 2 shows an example of an image processing apparatus 200 according to embodiments of the present disclosure. The image processing apparatus 200 includes processor unit 205, memory unit 210, training component 215, and machine learning model 220. Image processing apparatus is an example of, or includes aspects of, the corresponding element described with reference to FIG. 1. In some examples, training component 215 may be implemented on another apparatus other than image processing apparatus 200.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into processor unit 205. In some cases, processor unit 205 is configured to execute computer-readable instructions stored in a memory to perform various functions. In some embodiments, processor unit 205 includes special purpose components for modem processing, baseband processing, digital signal processing, or transmission processing. According to some embodiments, processor unit 205 is configured to perform operations of machine learning model 220.

Memory unit 210 includes instructions executable by processor unit 205. Examples of memory unit 210 include random access memory (RAM), read-only memory (ROM), or a hard disk. Examples of memory unit 210 include solid state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state. Memory unit 210 stores parameters of machine learning model 220.

According to some embodiments of the present disclosure, image processing apparatus 200 includes a computer implemented artificial neural network (ANN) for image generation. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to increase the accuracy of the result (i.e., by attempting to minimize a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, image processing apparatus 200 includes a convolutional neural network (CNN) for image generation. CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 215 initializes conditioning network 235. Training component 215 obtains training data including training guidance information and a ground-truth image depicting a scene based on the training guidance information. Training component 215 trains conditioning network 235 to modify predicted noise generated by diffusion model 230, where the conditioning network 235 is trained based on the training guidance information and the ground-truth image. In some examples, training component 215 computes a regularization loss term based on the noise modulation parameters that encourages conditioning network 235 to minimize perturbations to the intermediate noise prediction.

In some examples, training component 215 computes a divergence loss term based on the intermediate noise prediction and the modified intermediate noise prediction, where the training is based on the divergence loss term. In some examples, training component 215 computes a perceptual loss based on the final output prediction and the ground-truth image, where the training is based on the perceptual loss. In some examples, training component 215 computes a cross-entropy loss based on the non-textual modality information and the training guidance information, where the training is based on the cross-entropy loss. In some examples, training component 215 computes a Chamfer distance function based on the additional non-textual modality information and the training guidance information, where the training is based on the Chamfer distance function.

Machine learning model 220 may be used to make predictions based on input data in an application. Developing a machine learning model is an iterative process of writing, editing, re-writing, and testing configurations, algorithms, and model parameters. The process includes the stages of acquiring and exploring data, identifying features of the data, creating a model, evaluating the model, making predictions, and developing insights based on the model. The model can then be implemented on a large-scale platform providing for other users to deploy functionalities and capabilities from large datasets across different use cases.

According to some embodiments, machine learning model 220 obtains a noise image and guidance information for generating an image. In some examples, machine learning model 220 generates non-textual modality information based on the final output prediction. In some examples, machine learning model 220 generates additional non-textual modality information for a modality other than the non-textual modality information based on the final output prediction. Machine learning model 220 includes user interface 225, diffusion model 230, and conditioning network 235.

According to some embodiments, user interface 225 receives guidance information from a user for generating an image. For example, the guidance information includes segmentation information and sketch information of the image. In some examples, the guidance information includes segmentation information, i.e., without sketch information of the image. In some examples, user interface 225 provides the guidance information as an input to diffusion model 230, where the output image is conditioned based on the provided guidance information.

According to some embodiments, diffusion model 230 generates an intermediate noise prediction for the image based on the noise image. Diffusion model 230 combines the intermediate noise prediction and the noise modulation parameters to obtain a modified intermediate noise prediction. Diffusion model 230 generates the image based on the modified intermediate noise prediction, where the image depicts a scene based on the guidance information. In some examples, diffusion model 230 performs element-wise multiplication of the intermediate noise prediction and a first portion of the noise modulation parameters. Diffusion model 230 performs element-wise addition of the intermediate noise prediction and a second portion of the noise modulation parameters.

In some examples, diffusion model 230 iteratively generates a set of intermediate noise predictions corresponding to a set of diffusion steps, respectively. In some examples, diffusion model 230 generates an intermediate image prediction, where the noise modulation parameters are generated based on the intermediate image prediction. In some examples, diffusion model 230 generates a subsequent image prediction based on the intermediate image prediction and the modified intermediate noise prediction, where the image is generated based on the subsequent image prediction.

According to some embodiments, diffusion model 230 obtains a noise image. Diffusion model 230 generates an intermediate noise prediction based on the noise image. Diffusion model 230 combines the intermediate noise prediction and the noise modulation parameters to obtain a modified intermediate noise prediction. Diffusion model 230 generates a predicted image based on the modified intermediate noise prediction, where the training is based on the predicted image. In some examples, diffusion model 230 generates a final output prediction at an intermediate diffusion step. In some examples, diffusion model 230 is pretrained prior to training conditioning network 235.

According to some embodiments, diffusion model 230 is trained to generate images by iteratively generating intermediate noise predictions. In some embodiments, diffusion model 230 includes a U-Net architecture, where the noise modulation parameters are applied to an output of the U-Net architecture of the diffusion model. In some embodiments, the diffusion model includes text-guided diffusion model, and the diffusion model takes a text prompt as an input. In some embodiments, diffusion model 230 includes a denoising diffusion implicit model (DDIM). Diffusion model 230 is an example of, or includes aspects of, the corresponding element described with reference to FIGS. 3 and 5.

According to some embodiments, DDIM are a class of diffusion models. In some cases, DDIM refers to a denoising diffusion probabilistic model (DDPM) that is generalized via a class of non-Markovian diffusion processes. For example, the DDIM can be trained with the same objective function as DDPM. In some cases, DDIM includes forward processing that becomes deterministic in the image generation step. The implicit probabilistic model includes a sample generation process from latent variables with a fixed procedure that results in superior sample generation quality compared to DDPM.

In some cases, a DDIM starts with the same initial latent variable as DDPM and generates multiple samples of various lengths to generate high level features. A DDIM can perform semantically meaningful image interpolation by manipulating the initial latent variable. In some cases, DDIM generates an output image based on training using variational inference to produce samples matching a reference input image after finite time. In some examples, the output image accurately captures additional avenues of user control based on the input condition.

According to some embodiments, conditioning network 235 generates noise modulation parameters. In some cases, the guidance information includes non-textual guidance. In some cases, the guidance information includes an additional modality other than a training modality used for training diffusion model 230. In some cases, the guidance information includes multiple modalities. In some examples, conditioning network 235 iteratively generates a set of noise modulation parameters corresponding to the set of intermediate noise predictions, respectively, where the image is generated based on the set of noise modulation parameters.

According to some embodiments, conditioning network 235 predicts noise modulation parameters. In some cases, conditioning network 235 is trained to generate noise modulation parameters that, when combined with the intermediate noise predictions, cause diffusion model 230 to generate the images based on guidance information. In some cases, conditioning network 235 includes a U-Net architecture, where the noise modulation parameters include an output of the U-Net architecture of the conditioning network 235. Conditioning network 235 is an example of, or includes aspects of, the corresponding element described with reference to FIG. 5.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 3:
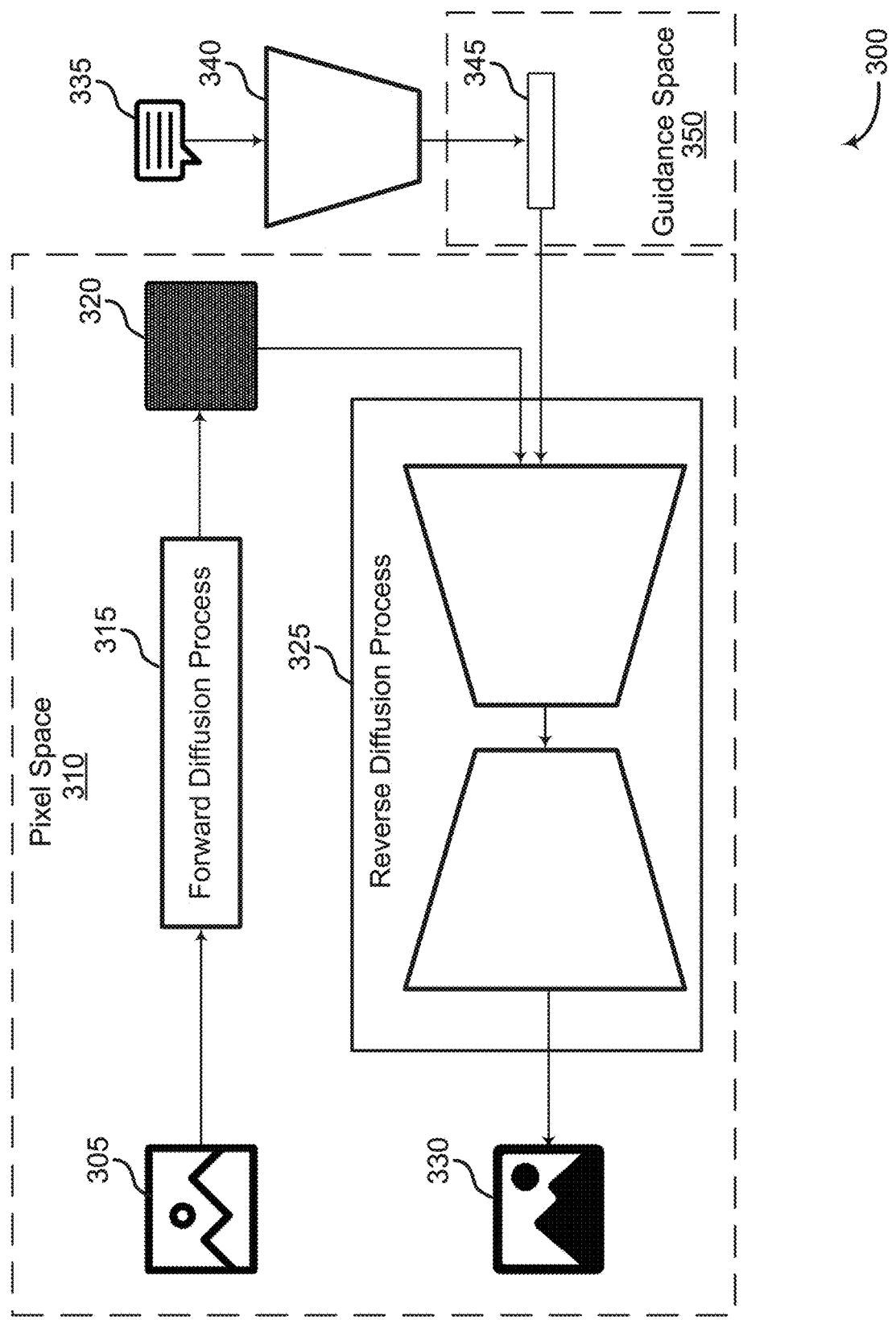
FIG. 3 shows an example of a pixel diffusion model according to embodiments of the present disclosure.

FIG. 3 shows an example of a pixel diffusion model 300 according to embodiments of the present disclosure. The example shown includes pixel diffusion model 300, image 305, pixel space 310, forward diffusion process 315, noisy image 320, reverse diffusion process 325, final output image 330, text prompt 335, text encoder 340, guidance features 345, and guidance space 350. The diffusion model 300 depicted in FIG. 3 is an example of, or includes aspects of, the corresponding element described with reference to FIG. 2.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include DDPMs and DDIMs. In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, pixel diffusion model 300 may take an original image 305 in a pixel space 310 as input and apply forward diffusion process 315 to gradually add noise to the original image 305 to obtain noisy images 320 at various noise levels.

Next, a reverse diffusion process 325 (e.g., a U-Net ANN) gradually removes the noise from the noisy images 320 at the various noise levels to obtain an output image 330. In some cases, an output image 330 is created from each of the various noise levels. The output image 330 can be compared to the original image 305 to train the reverse diffusion process 325.

The reverse diffusion process 325 can also be guided based on a text prompt 335, or another guidance prompt, such as an image, a layout, a segmentation map, etc. The text prompt 335 can be encoded using a text encoder 340 (e.g., a multi-modal encoder) to obtain guidance features 345 in guidance space 350. The guidance features 345 can be combined with the noisy images 320 at one or more layers of the reverse diffusion process 325 to ensure that the output image 330 includes content described by the text prompt 335. For example, guidance features 345 can be combined with the noisy features using a cross-attention block within the reverse diffusion process 325.

In the machine learning field, attention mechanism is a method of placing differing levels of importance on different elements of an input. Calculating attention may involve three basic steps. First, a similarity between query and key vectors obtained from the input is computed to generate attention weights. Similarity functions used for this process can include dot product, splice, detector, and the like. Next, a softmax function is used to normalize the attention weights. Finally, the attention weights are weighed together with their corresponding values.

According to an embodiment of the present disclosure, image 305 is an example of, or includes aspects of, the corresponding element described with reference to FIG. 5. Forward diffusion process 315 is an example of, or includes aspects of, the corresponding element described with reference to FIG. 11. Noisy image 320 is an example of, or includes aspects of, the corresponding element described with reference to FIG. 11. Reverse diffusion process 325 is an example of, or includes aspects of, the corresponding element described with reference to FIG. 11.

Figure 4:
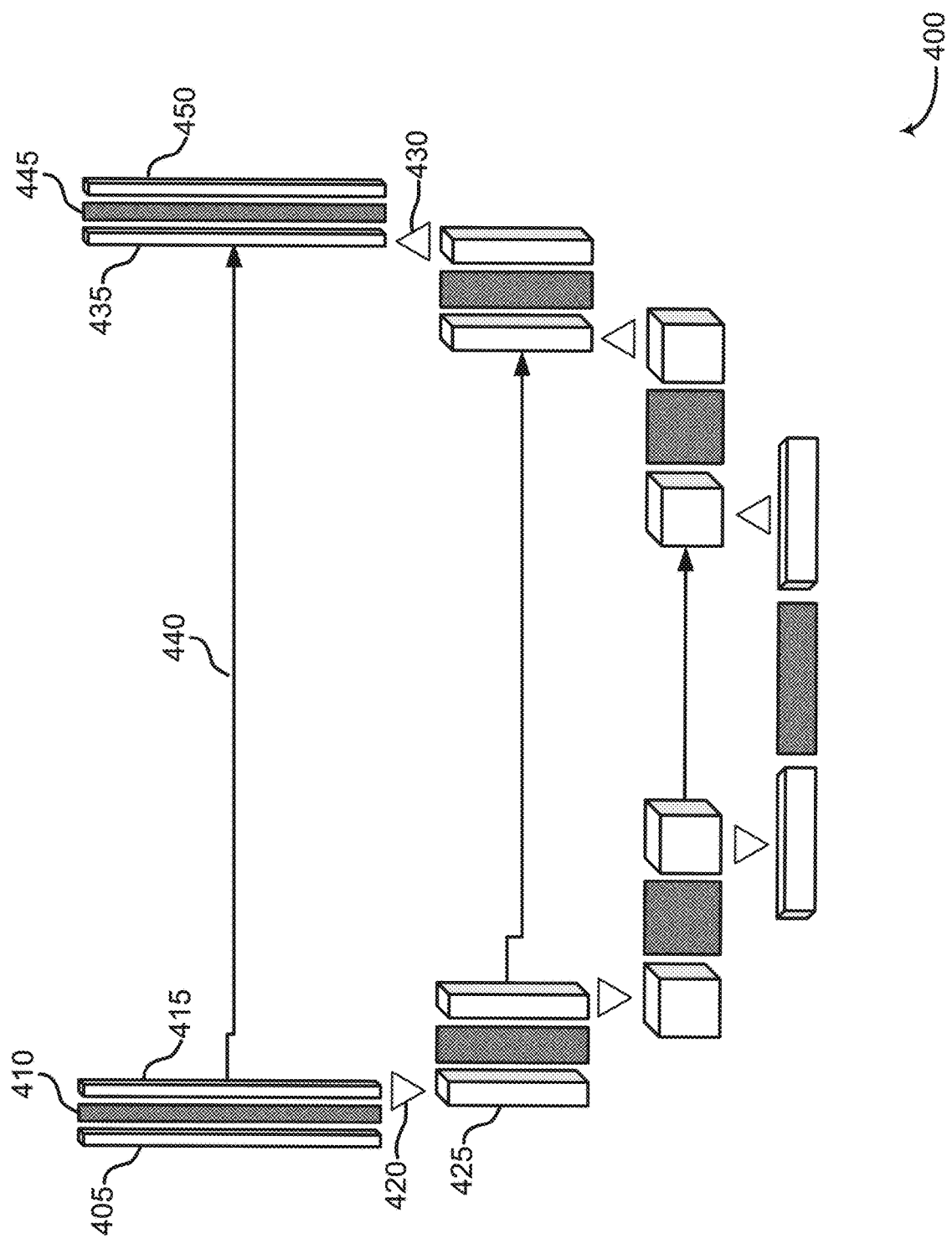
FIG. 4 shows an example of U-net architecture according to embodiments of the present disclosure.

FIG. 4 shows an example of U-net 400 architecture according to embodiments of the present disclosure. The example shown includes U-Net 400, input features 405, initial neural network layer 410, intermediate features 415, down-sampling layer 420, down-sampled features 425, up-sampling layer 430, up-sampled features 435, skip connection 440, final neural network layer 445, and output features 450. The U-Net 400 depicted in FIG. 4 is an example of, or includes aspects of, the architecture used within the reverse diffusion process described with reference to FIG. 3.

In some examples, diffusion models are based on a neural network architecture known as a U-Net. The U-Net 400 takes input features 405 having an initial resolution and an initial number of channels, and processes the input features 405 using an initial neural network layer 410 (e.g., a convolutional network layer) to produce intermediate features 415. The intermediate features 415 are then down-sampled using a down-sampling layer 420 such that down-sampled features 425 features have a resolution less than the initial resolution and a number of channels greater than the initial number of channels.

This process is repeated multiple times, and then the process is reversed. That is, the down-sampled features 425 are up-sampled using up-sampling process 430 to obtain up-sampled features 435. The up-sampled features 435 can be combined with intermediate features 415 having a same resolution and number of channels via a skip connection 440. These inputs are processed using a final neural network layer 445 to produce output features 450. In some cases, the output features 450 have the same resolution as the initial resolution and the same number of channels as the initial number of channels.

In some cases, U-Net 400 takes additional input features to produce conditionally generated output. For example, the additional input features could include a vector representation of an input prompt. The additional input features can be combined with the intermediate features 415 within the neural network at one or more layers. For example, a cross-attention module can be used to combine the additional input features and the intermediate features 415.

Figure 5:
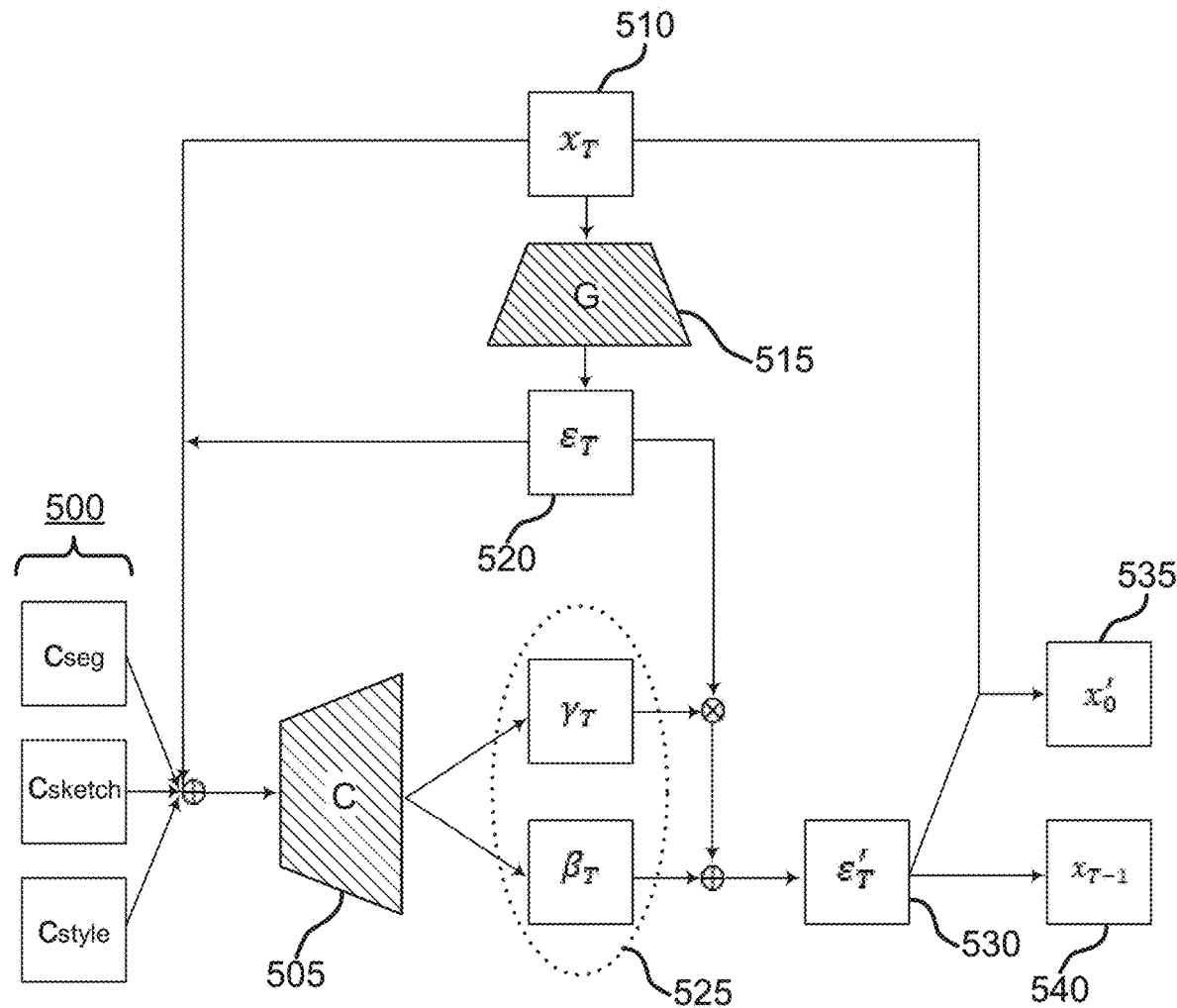
FIG. 5 shows an example of a machine learning model according to embodiments of the present disclosure.

FIG. 5 shows an example of a machine learning model according to embodiments of the present disclosure. The example shown includes guidance information 500, conditioning network 505, noise image 510, diffusion model 515, intermediate noise prediction 520, noise modulation parameters 525, modified intermediate noise prediction 530, denoised image 535, and intermediate image prediction 540. Denoised image 535 may also be referred to as a predicted image or a predicted output image. Conditioning network 505 is an example of, or includes aspects of, the corresponding element described with reference to FIG. 2.

In some cases, a diffusion model includes a forward diffusion process for adding noise to an image (or features in a latent space) and a reverse diffusion process for denoising the images (or features) to obtain a denoised image. In some cases, the forward diffusion process is used during training to generate images with successively greater noise, and a neural network is trained to perform the reverse diffusion process (i.e., to successively remove the noise). In some cases, diffusion model 515 is a frozen pre-trained diffusion model with fixed weights. The pre-trained diffusion model takes noise image 510 as input and computes intermediate noise prediction 520. Here, intermediate noise prediction 520 may be denoted as ET. Diffusion model 515 is an example of, or includes aspects of, the corresponding element described with reference to FIG. 2.

According to an embodiment of the present disclosure, conditioning network 505 guides the reverse denoising process. Conditioning network 505 guides the reverse denoising process of the DDIM to generate noise modulation parameters 525 based on guidance information 500. In some examples, guidance information 500 includes segmentation information $C_{seg}$, sketch information $C_{sketch}$, style information $C_{style}$, or any combination thereof. Conditioning network 505 adds noise modulation parameters 525 to intermediate noise prediction 520 to generate modified intermediate noise prediction 530.

Machine learning model 220, as described with reference to FIG. 2, predicts a completely denoised image 535 based on modified intermediate noise prediction 530. Denoised image 535 is an example of, or includes aspects of, the corresponding element described with reference to FIG. 3.

One or more embodiments of the present disclosure convert a pre-trained diffusion model into a multi-modal conditional model. The machine learning model includes a pre-trained diffusion model G. Training component 215 trains a conditioning module C to guide the reverse denoising process of DDIM. At each timestep T, the machine learning model passes the current sampled image $x_T$ through the pre-trained diffusion model G, which predicts the noise ET that was added between timestep T−1 and timestep T during the fixed forward noising process. Next, the machine learning model concatenates the sampled image $x_T$, noise ET, and the conditioning modalities $C_{\{seg,sketch,style\}}$ as input to the conditioning module C. The machine learning model outputs modulation parameters, $\gamma_T$ and $\beta_T$. Modulation parameters $\gamma_T$ and $\beta_T$ are element-wise multiplied and added, respectively, to $\varepsilon_T$ (i.e., intermediate noise prediction 520) to obtain E (i.e., modified intermediate noise prediction 530). The machine learning model computes the next timestep image $x_{T-1}$ and the predicted fully-denoised image $x_0'$.

Figure 8:
FIG. 8 shows an example of image generation based on multiple modalities as guidance information according to embodiments of the present disclosure.

Referring to FIG. 8 as an example, the machine learning model receives segmentation map 800 and input sketch 805 including $c_{segmap}$ and $c_{sketch}$ as conditioning modalities. A conditioning network is trained to guide the reverse denoising process of the DDIM. At each timestep, the machine learning model passes the current sampled image through the pre-trained diffusion model, which predicts the noise that was added between two timesteps during the fixed forward noising process.

Next, the machine learning model concatenates the sampled image, noise, and the conditioning modalities $c_{segmap}$ and $c_{sketch}$ as input to the conditioning network C. In some cases, the pre-trained diffusion model and conditioning network are used to provide modulation parameters $\gamma$ and $\beta$ based on segmentation map 800 and input sketch 805. In some cases, the machine learning model computes the next timestep image and subsequently predicts a fully-denoised image $x_0'$. For example, generated image 810 may be referred to as a fully-denoised image $x_0'$.

According to an embodiment, the machine learning model includes a time-conditioned U-Net to implement the conditioning network C. The conditioning network C has two heads to predict modulation parameters $\gamma$ and @ separately. The conditioning network C uses fewer layers and filters, amounting to a small percentage of the total number of parameters of pre-trained diffusion model G. In some cases, the machine learning model can up-sample generated images to higher resolution(s).

Image Generation

In FIGS. 6-11, a method, apparatus, and non-transitory computer readable medium for image processing is described. One or more embodiments of the method, apparatus, and non-transitory computer readable medium include obtaining a noise image and guidance information for generating an image; generating an intermediate noise prediction for the image based on the noise image using a diffusion model; generating noise modulation parameters using a conditioning network; combining the intermediate noise prediction and the noise modulation parameters to obtain a modified intermediate noise prediction; and generating the image based on the modified intermediate noise prediction, wherein the image depicts a scene based on the guidance information.

In some embodiments, the guidance information comprises non-textual guidance. In some embodiments, the guidance information comprises an additional modality other than a training modality used for training the diffusion model. In some embodiments, the guidance information comprises multiple modalities.

Some examples of the method, apparatus, and non-transitory computer readable medium further include performing element-wise multiplication of the intermediate noise prediction and a first portion of the noise modulation parameters. Some examples further include performing element-wise addition of the intermediate noise prediction and a second portion of the noise modulation parameters.

Some examples of the method, apparatus, and non-transitory computer readable medium further include iteratively generating a plurality of intermediate noise predictions corresponding to a plurality of diffusion steps, respectively. Some examples further include iteratively generating a plurality of noise modulation parameters corresponding to the plurality of intermediate noise predictions, respectively, wherein the image is generated based on the plurality of noise modulation parameters.

Some examples of the method, apparatus, and non-transitory computer readable medium further include generating an intermediate image prediction, wherein the noise modulation parameters are generated based on the intermediate image prediction.

Some examples of the method, apparatus, and non-transitory computer readable medium further include generating a subsequent image prediction based on the intermediate image prediction and the modified intermediate noise prediction, wherein the image is generated based on the subsequent image prediction.

Figure 6:
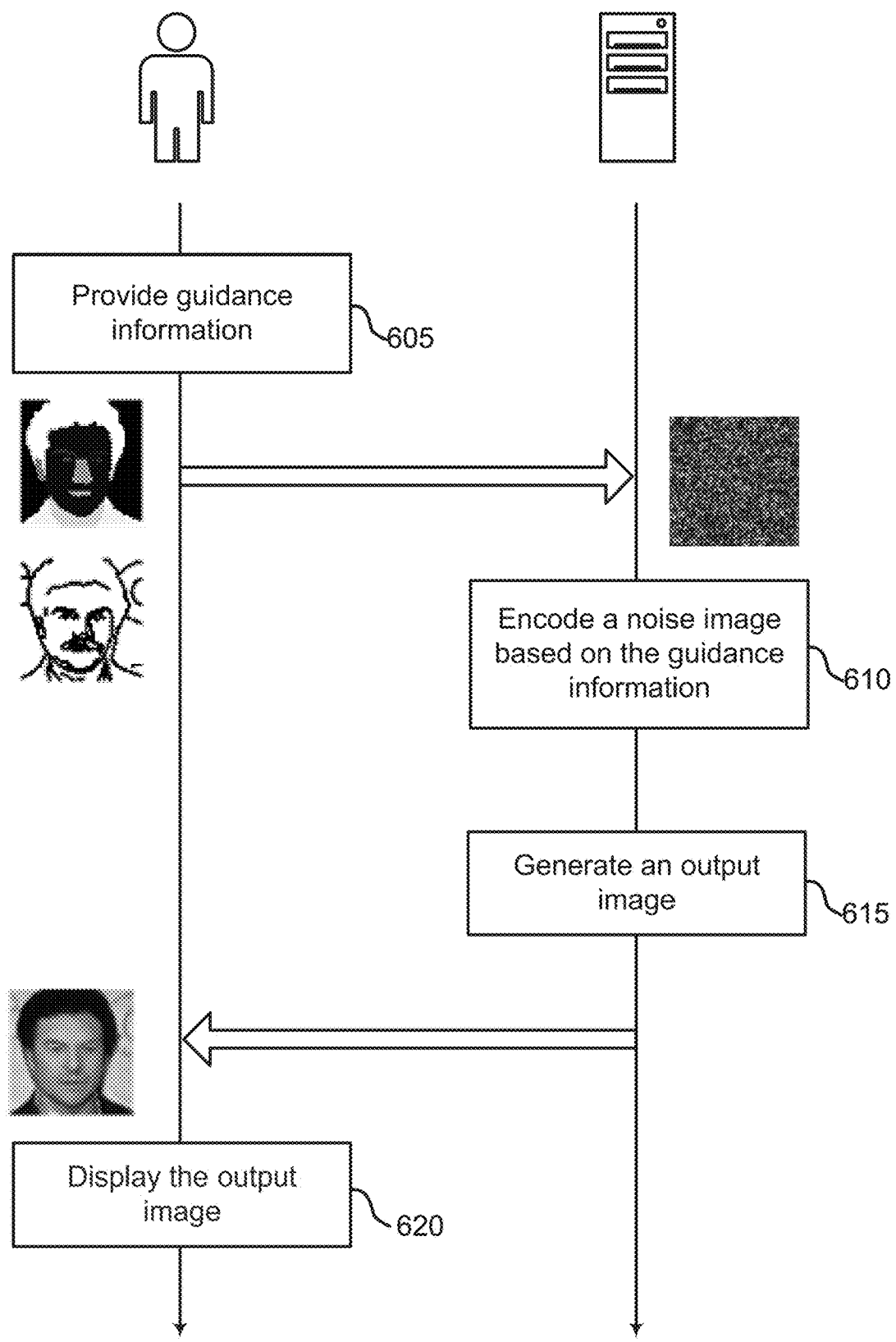
FIG. 6 shows an example of image generation according to embodiments of the present disclosure.

FIG. 6 shows an example of image generation process according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with embodiments of the present disclosure. In some cases, the operations described herein are composed of various substeps, or are performed in conjunction with other operations.

At operation 605, the user provides guidance information. In some cases, the operations of this step refer to, or may be performed by, a user as described with reference to FIG. 1. As an example shown in FIG. 6, the guidance information includes segmentation information and sketch information for generating an output image. In some cases, the user provides the guidance information via a user interface of the system.

At operation 610, the system encodes a noise image based on the guidance information. In some cases, the operations of this step refer to, or may be performed by, an image processing apparatus as described with reference to FIG. 1. The image processing apparatus trains a conditioning network and uses a pre-trained diffusion model to generate an intermediate image and a noise prediction.

At operation 615, the system generates an output image based on the encoding. In some cases, the operations of this step refer to, or may be performed by, an image processing apparatus as described with reference to FIGS. 1 and 2. In some cases, the output image is generated based on the intermediate image and noise predictions. In some examples, the image processing apparatus generates the output image using the diffusion model. The diffusion model predicts the output image that depicts a scene based on the guidance information and the noise image.

At operation 620, the system displays the output image to the user. In some cases, the operations of this step refer to, or may be performed by, a user interface as described with reference to FIG. 2. In some cases, the image processing apparatus displays the image to the user via a user interface. For example, the output image is a high-quality image that accurately captures the segmentation information and the sketch information as provided.

Figure 7:
FIG. 7 shows an example of image generation based on a single modality as guidance information according to embodiments of the present disclosure.

FIG. 7 shows an example of image generation based on a single modality as guidance information according to embodiments of the present disclosure. The example shown includes segmentation map 700, input sketch 705, and generated image 710. Segmentation map 700 is input to the image processing apparatus. As shown in FIG. 7, input sketch 705 is optional and not provided for image generation. That is, images are generated based on the presence of one modality (input segmentation map). Here, the modality refers to segmentation map 700.

In some cases, a segmentation map partitions an image into multiple segments. In some examples, a segmentation map is used to locate objects and boundaries (e.g., lines, curves, etc.) in images by assigning a label to each pixel in an image such that pixels with the same label share certain characteristics. According to an embodiment of the present disclosure, segmentation map 700 can be used as the only conditioning modality (e.g., to train conditioning network C) and is represented as $c_{segmap}$. Segmentation map 700 is an example of, or includes aspects of, the corresponding element described with reference to FIGS. 8 and 10.

A sketch is a representation of an image using lines to indicate the primary features of an object or features in a scene. In some cases, an input sketch is used as a conditioning modality and is represented as $c_{sketch}$. In some examples, input sketch 705 is optional and not provided. Hence the row representing input sketch 705 includes a black canvas.

According to an embodiment, conditioning network 505, as described with reference to FIG. 5, provides users with varying degrees of control over a generated image by providing one or more target modalities at inference time. In some cases, an image is generated when a single modality is used to train the conditioning network C. Generated image 710 (produced by a pre-trained segmentation network) accurately follows the segmentation map and is not dependent on input sketch 705.

FIG. 8 shows an example of image generation based on multiple modalities as guidance information according to embodiments of the present disclosure. The example shown includes segmentation map 800, input sketch 805, and generated image 810. Segmentation map 800 is an example of, or includes aspects of, the corresponding element described with reference to FIGS. 7 and 10.

According to an embodiment of the present disclosure, segmentation map 800 and input sketch 805 are provided and used to predict generated image 810. Accordingly, generated image 810 (produced by a pre-trained segmentation network) accurately follows segmentation map 800 and input sketch 805. During training, segmentation map 800 and input sketch 805 are used to train the conditioning network C. Embodiments of the present disclosure are not limited to modalities mentioned above and can include other modalities for training the conditioning network and image generation at inference time.

Figure 9:
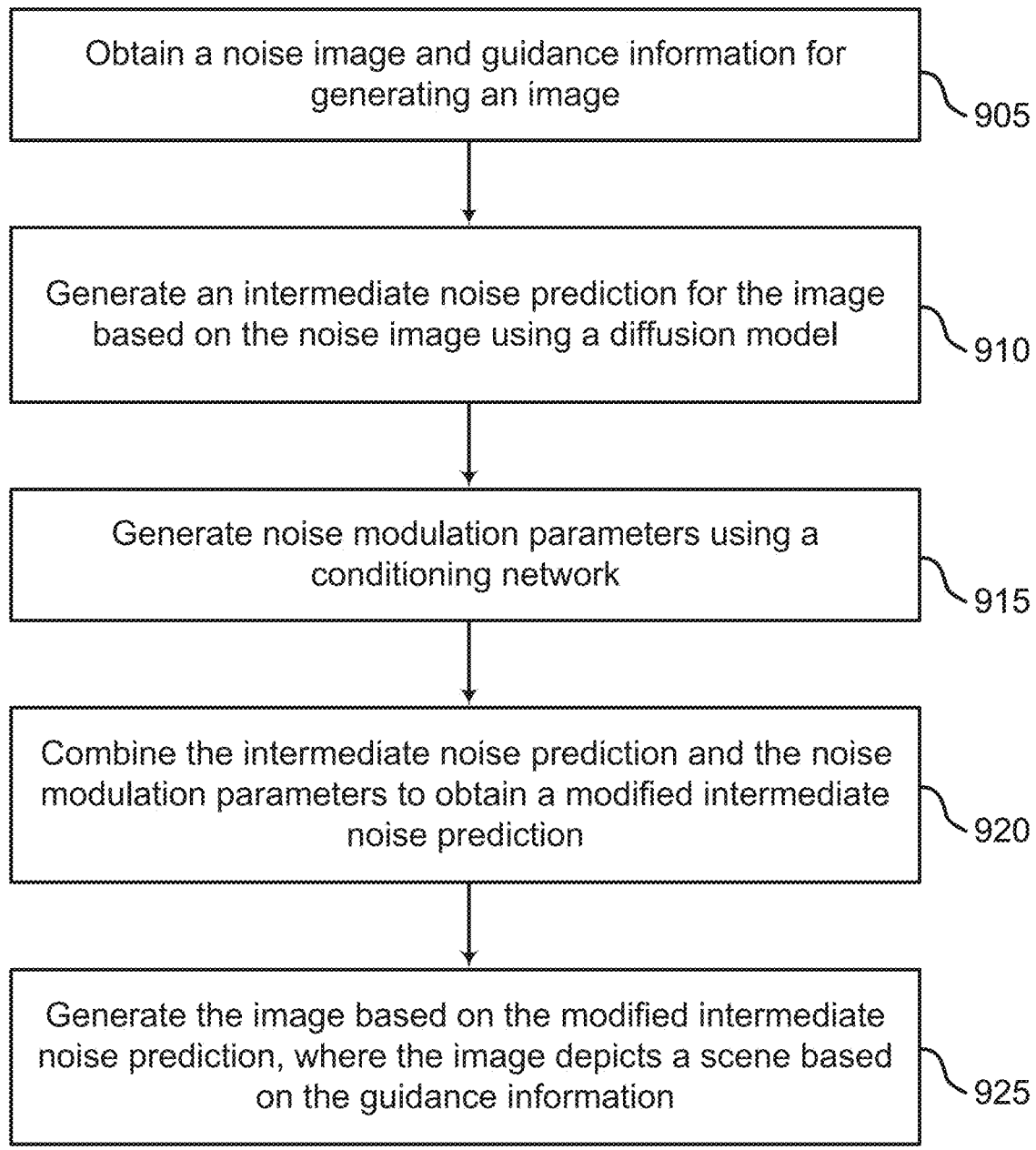
FIG. 9 shows an example of a method for image generation according to embodiments of the present disclosure.

FIG. 9 shows an example of a method for image generation according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system obtains a noise image and guidance information for generating an image. For example, the guidance information may be provided as input by the user. In some cases, the guidance information is encoded information (e.g., from a multimodal encoder that can take text or image input). In some cases, the operations of this step refer to, or may be performed by, a machine learning model as described with reference to FIG. 2. In some examples, the guidance information includes segmentation information $c_{segmap}$, sketch information $c_{sketch}$, style information $c_{style}$, or any combination thereof as conditioning modalities for image generation.

At operation 910, the system generates an intermediate noise prediction for the image based on the noise image using a diffusion model. For example, intermediate noise prediction 520, as described with reference to FIG. 5, for the image can be represented as ET. In some cases, the operations of this step refer to, or may be performed by, a diffusion model as described with reference to FIGS. 2 and 5.

According to some embodiments of the present disclosure, diffusion model is a pre-trained diffusion model with fixed weight values. In some cases, pre-trained diffusion model 515, as described with reference to FIG. 5, takes a noise image and applies a reverse diffusion process to generate noise prediction from the noise image. The reverse diffusion process is also referred to as reverse denoising process.

According to an embodiment, the pre-trained diffusion model begins with a noise image $x_t$ and generates noise Et. For example, the noise is Gaussian noise. At each timestep T, the machine learning model passes the current sampled image $x_T$ through the pre-trained diffusion model G, which predicts the noise $\varepsilon_T$ that was added between timestep T−1 and timestep T during the forward diffusion process. The noise $\varepsilon_T$ may be referred to as an intermediate noise prediction for the image.

At operation 915, the system generates noise modulation parameters using a conditioning network. For example, noise modulation parameters 525, as described with reference to FIG. 5, are represented as $\gamma_T$ and $\beta_T$. In some cases, the operations of this step refer to, or may be performed by, a conditioning network as described with reference to FIGS. 2 and 5. The conditioning network may be a component of a diffusion model. Accordingly, the operations of this step refer to, or may be performed by, a diffusion model as described with reference to FIGS. 2 and 5.

One or more embodiments of the present disclosure include a conditioning network configured to condition the generative network on one or more modalities. The conditioning network guides the reverse denoising process of the DDIM. In some cases, the machine learning model concatenates the sampled image $x_T$, noise $\varepsilon_T$, and the conditioning modalities $C_{\{seg, sketch, style\}}$ that are input to the conditioning network C. Accordingly, noise modulation parameters $\gamma_T$ and $\beta_T$ are obtained from the conditioning network for each timestep based on the concatenation. $\gamma_T$ and $\beta_T$ may be referred to as a first portion and a second portion of the noise modulation parameters, respectively.

At operation 920, the system combines the intermediate noise prediction and the noise modulation parameters to obtain a modified intermediate noise prediction. In some cases, the operations of this step refer to, or may be performed by, a diffusion model as described with reference to FIGS. 2 and 5. For example, the modulation parameters $\gamma_T$ and $\beta_T$ for each timestep are element-wise multiplied and element-wise added, respectively, to the noise $\varepsilon_T$ to obtain a modified intermediate noise prediction $\varepsilon_T'$.

At operation 925, the system generates the image based on the modified intermediate noise prediction, where the image depicts a scene based on the guidance information. In some cases, the operations of this step refer to, or may be performed by, a diffusion model as described with reference to FIGS. 2 and 5.

According to an embodiment, the diffusion model computes the next timestep image $x_{T-1}$ and subsequently the predicted fully-denoised image $x_0'$. In some cases, the fully-denoised image is predicted based on the modified intermediate noise prediction $\varepsilon_T'$ and sampled image $x_T$. The diffusion model accurately captures the non-canonical relationships between objects based on the input guidance information and generates photorealistic images. $x_0'$ is also known as the generated image at inference time. The generated image depicts a scene based on the guidance information. The generated image is transmitted to a user who desires certain attributes and features indicated in the guidance information.

Figure 10:
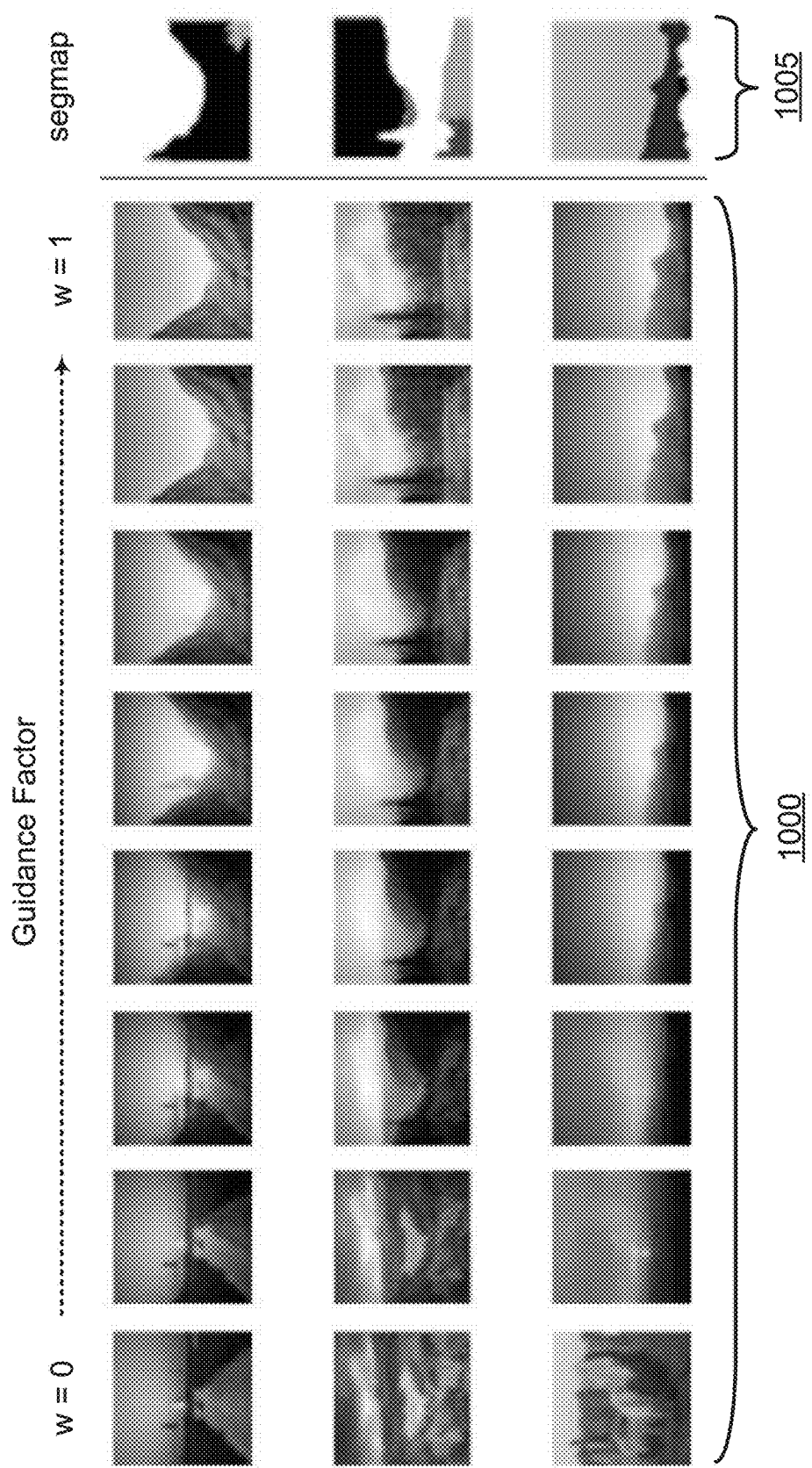
FIG. 10 shows an example of an image sampling process by varying a guidance factor according to embodiments of the present disclosure.

FIG. 10 shows an example of an image sampling process by varying a guidance factor according to embodiments of the present disclosure. The example shown includes sampled images 1000 and segmentation map 1005. Segmentation map 1005 is an example of, or includes aspects of, the corresponding element described with reference to FIGS. 7 and 8.

An embodiment of the present disclosure includes visualization of the effect of the conditioning network on the sampling process. In some cases, a guidance factor is varied to visualize the effect of the conditioning network on sampled images 1000. In some examples, the guidance factor is represented as w. In an example, when w=0, the sampled image (i.e., the leftmost column of sampled images 1000) is a random unconditional sample from pre-trained diffusion model G. This sampled image does not match segmentation map 1005 (shown on the righthand side or "segmap" column).

As the value of guidance factor w increases, the effect of input conditioning on the sampling process gradually increases. For example, as w→1, the conditioning network increases the strength of the segmentation map. The unconditioned sampled images smoothly transition into sampled images that closely follow the (input) segmentation maps. For example, the sampled image on the rightmost column of sampled images 1000 matches segmentation map 1005 accurately.

Figure 11:
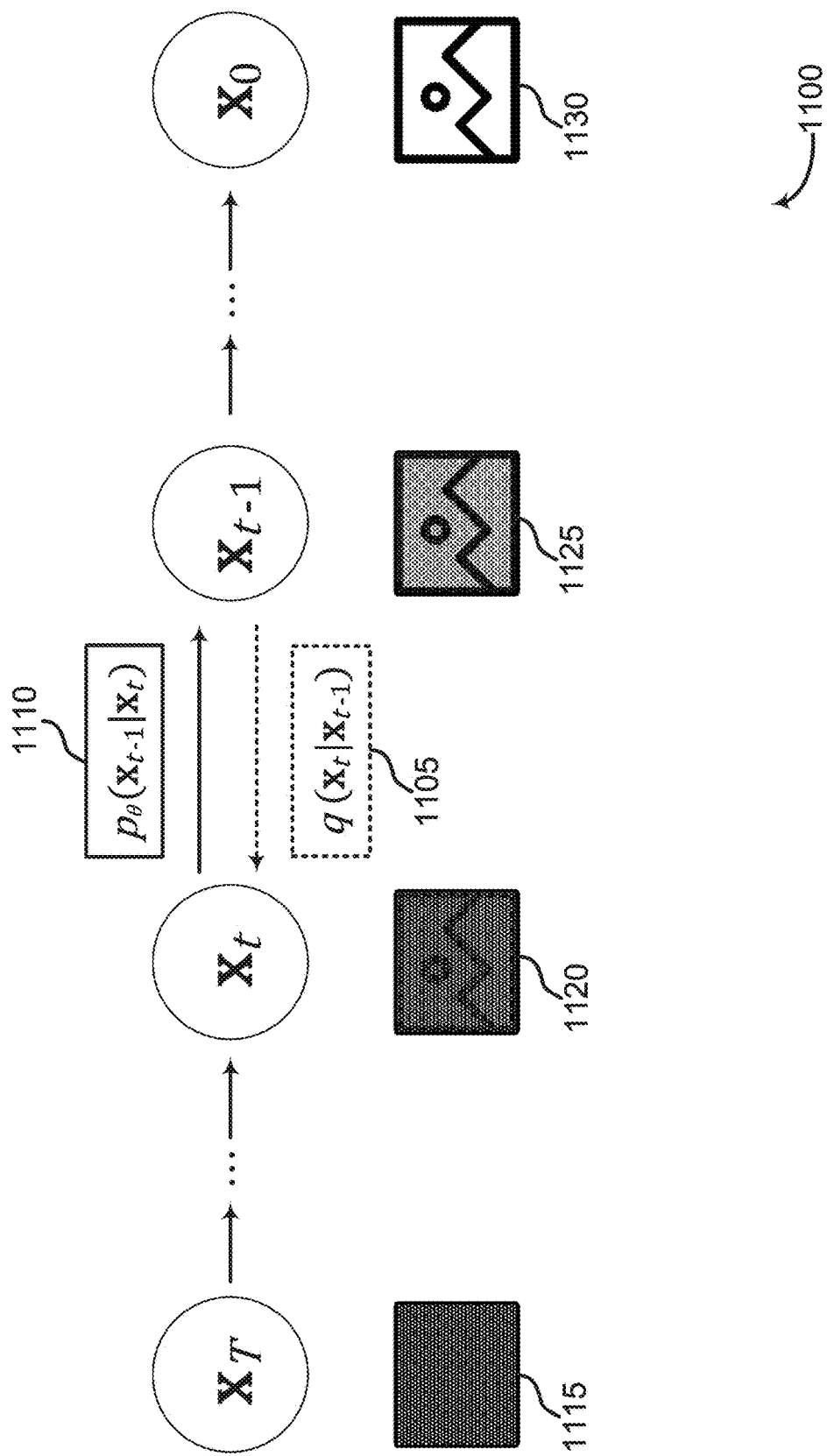
FIG. 11 shows an example of reverse diffusion according to embodiments of the present disclosure.

FIG. 11 shows an example of reverse diffusion according to embodiments of the present disclosure. The example shown includes diffusion process 1100, forward diffusion process 1105, reverse diffusion process 1110, noisy image 1115, first intermediate image 1120, second intermediate image 1125, and original image 1130. Forward diffusion process 1105 is an example of, or includes aspects of, the corresponding element described with reference to FIG. 3. Reverse diffusion process 1110 is an example of, or includes aspects of, the corresponding element described with reference to FIG. 3. Noisy image 1115 is an example of, or includes aspects of, the corresponding element described with reference to FIG. 3.

As described above with reference to FIG. 3, a diffusion model includes a forward diffusion process 1105 for adding noise to an image (or features in a latent space) and a reverse diffusion process 1110 for denoising the images (or features) to obtain a denoised image. The forward diffusion process 1105 can be represented as $q(x_t|x_{t-1})$, and the reverse diffusion process 1110 can be represented as $p(x_{t-1}|x_t)$. In some cases, the forward diffusion process 1105 is used during training to generate images with successively greater noise, and a neural network is trained to perform the reverse diffusion process 1110 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 1110, the model begins with noisy data $x_T$, such as a noisy image 1115 and denoises the data to obtain the $p(x_{t-1}|x_t)$. At each step t−1, the reverse diffusion process 1110 takes $x_t$, such as first intermediate image 1120, and t as input. Here, t represents a step in the sequence of transitions associated with different noise levels, The reverse diffusion process 1110 outputs $x_{t-1}$, such as second intermediate image 1125 iteratively until $x_T$ is reverted back to $x_0$, the original image 1130. The reverse process can be represented as:

$$p_\theta(x_{t-1}|x_t) := N(x_{t-1}; \mu_\theta(x_t, t), \Sigma_\theta(x_t, t)). \quad (1)$$

The joint probability of a sequence of samples in the Markov chain can be written as a product of conditionals and the marginal probability:

$$x_T: p_\theta(x_{0:T}) := p(x_T)\prod_{t=1}^{T} p_\theta(x_{t-1}|x_t), \quad (2)$$

where $p(x_T)=N(x_T; 0, I)$ is the pure noise distribution as the reverse process takes the outcome of the forward process, a sample of pure noise, as input and $\prod_{t=1}^{T} p_\theta(x_{t-1}|x_t)$ represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and x represents the generated image with high image quality.

Training and Evaluation

Figure 12:
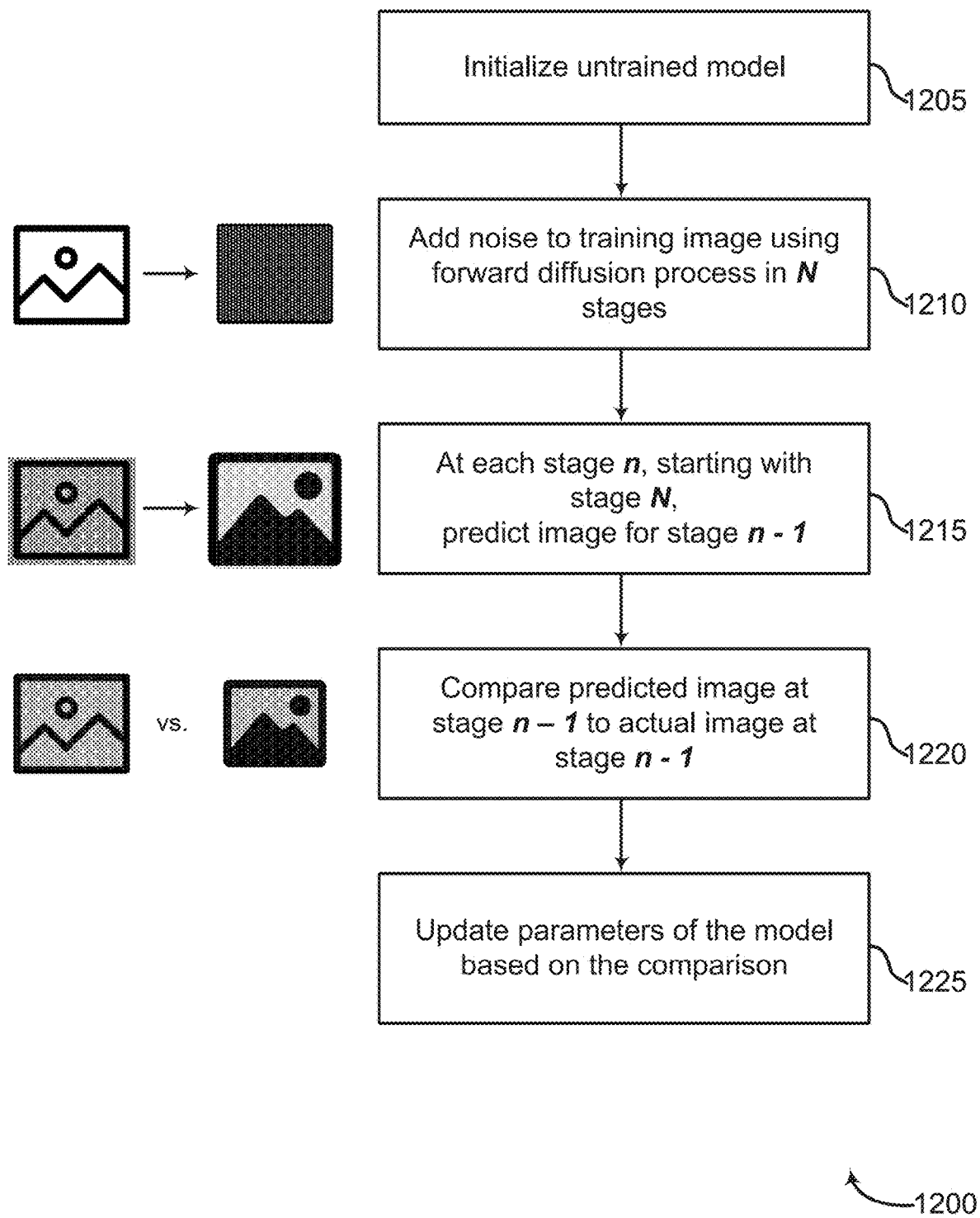
FIG. 12 shows an example of a method for training a diffusion model according to embodiments of the present disclosure.
Figure 13:
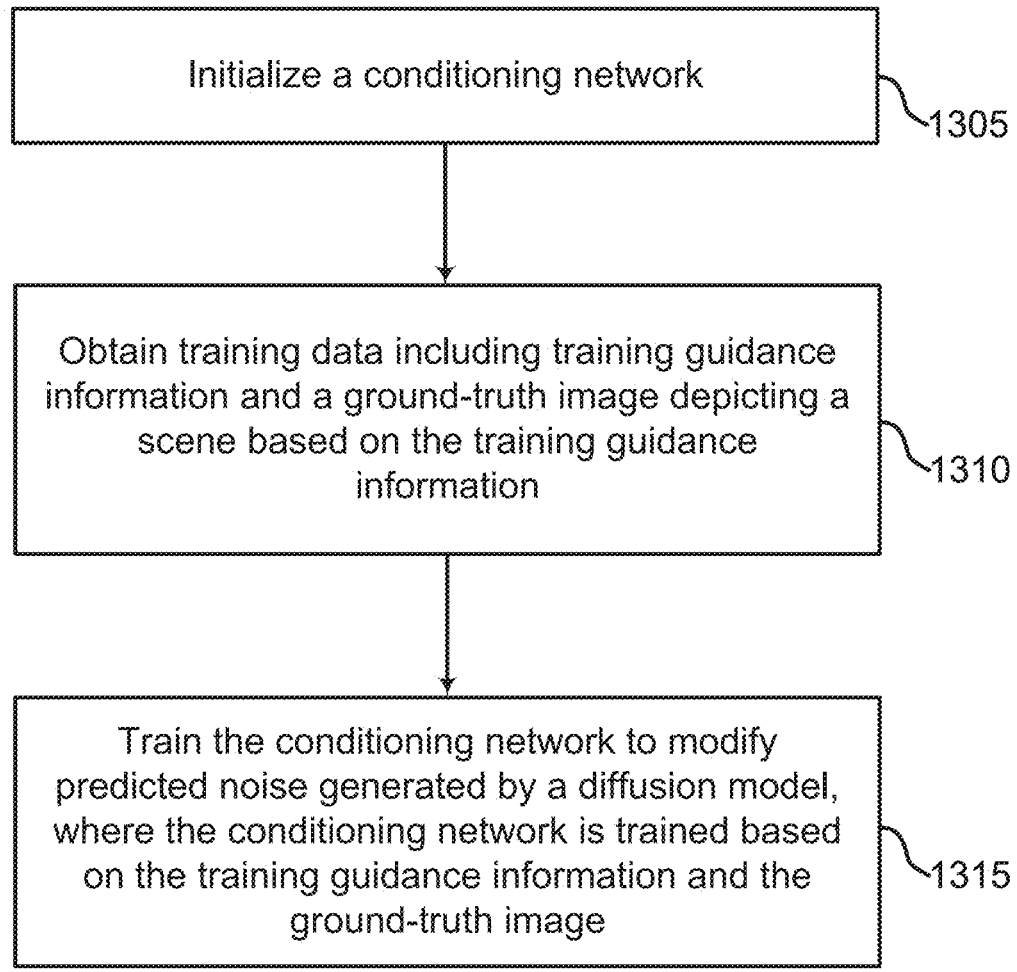
FIG. 13 shows an example of a method for training a conditioning network according to embodiments of the present disclosure.

In FIGS. 12-13, a method, apparatus, and non-transitory computer readable medium for image processing are described. One or more embodiments of the method, apparatus, and non-transitory computer readable medium include initializing a conditioning network; obtaining training data comprising training guidance information and a ground-truth image depicting a scene based on the training guidance information; and training the conditioning network to modify predicted noise generated by a diffusion model, wherein the conditioning network is trained based on the training guidance information and the ground-truth image.

Some examples of the method, apparatus, and non-transitory computer readable medium further include obtaining a noise image. Some examples further include generating an intermediate noise prediction based on the noise image using the diffusion model. Some examples further include predicting noise modulation parameters using the conditioning network. Some examples further include combining the intermediate noise prediction and the noise modulation parameters to obtain a modified intermediate noise prediction. Some examples further include generating a predicted image based on the modified intermediate noise prediction, wherein the training is based on the predicted image.

Some examples of the method, apparatus, and non-transitory computer readable medium further include computing a regularization loss term based on the noise modulation parameters that encourages the conditioning network to minimize perturbations to the intermediate noise prediction.

Some examples of the method, apparatus, and non-transitory computer readable medium further include computing a divergence loss term based on the intermediate noise prediction and the modified intermediate noise prediction, wherein the training is based on the divergence loss term.

Some examples of the method, apparatus, and non-transitory computer readable medium further include generating a final output prediction at an intermediate diffusion step of the diffusion model. Some examples further include computing a perceptual loss based on the final output prediction and the ground-truth image, wherein the training is based on the perceptual loss.

Some examples of the method, apparatus, and non-transitory computer readable medium further include generating a final output prediction at an intermediate diffusion step of the diffusion model. Some examples further include generating non-textual modality information based on the final output prediction. Some examples further include computing a cross-entropy loss based on the non-textual modality information and the training guidance information, wherein the training is based on the cross-entropy loss.

Some examples of the method, apparatus, and non-transitory computer readable medium further include generating additional non-textual modality information for a modality other than the non-textual modality information based on the final output prediction. Some examples further include computing a Chamfer distance function based on the additional non-textual modality information and the training guidance information, wherein the training is based on the Chamfer distance function. In some embodiments, the diffusion model is pre-trained prior to the training of the conditioning network.

FIG. 12 shows an example of a method 1200 for training a diffusion model according to embodiments of the present disclosure. The method 1200 represents an example for training a reverse diffusion process as described above with reference to FIG. 11. In some examples, these operations are performed by a system including a processor executing a set of codes to control functional elements of an apparatus, such as the apparatus described in FIG. 2.

Additionally or alternatively, certain processes of method 1200 may be performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like. In some cases, the operations of this step refer to, or may be performed by, a training component as described with reference to FIG. 2.

At operation 1210, the system adds noise to a training image using a forward diffusion process in N stages. In some cases, the forward diffusion process is a fixed process where Gaussian noise is successively added to an image. In latent diffusion models, the Gaussian noise may be successively added to features in a latent space. In some cases, the operations of this step refer to, or may be performed by, a training component as described with reference to FIG. 2.

At operation 1215, the system at each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process. In some cases, the operations of this step refer to, or may be performed by, a diffusion model as described with reference to FIGS. 2 and 5.

At operation 1220, the system compares predicted image (or image features) at stage n−1 to an actual image (or image features), such as the image at stage n−1 or the original input image. For example, given observed data x, the diffusion model may be trained to minimize the variational upper bound of the negative log-likelihood −log $p_\theta(x)$ of the training data. In some cases, the operations of this step refer to, or may be performed by, a training component as described with reference to FIG. 2.

At operation 1225, the system updates parameters of the model based on the comparison. For example, parameters of a U-Net may be updated using gradient descent. Time-dependent parameters of the Gaussian transitions can also be learned. In some cases, the operations of this step refer to, or may be performed by, a training component as described with reference to FIG. 2.

FIG. 13 shows an example of a method for training a conditioning network according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with embodiments of the present disclosure. In some cases, the operations described herein are composed of various substeps, or are performed in conjunction with other operations.

At operation 1305, the system initializes a conditioning network. In some cases, the conditioning network C provides users with varying degrees of control over a generated image by providing a subset or all of the target modalities at inference. In some cases, one or more modalities are used to train the conditioning network C. For example, a single modality is used to train the conditioning network C. In some cases, the operations of this step refer to, or may be performed by, a training component as described with reference to FIG. 2. Following operation(s) train a small conditioning network that conditions a pre-trained diffusion model on one or more modalities not present during the original training process. Such modalities enable different types of control (e.g., spatial layout via a semantic segmentation map and a sketch, and texture/color via a style image). The diffusion model itself is not retrained or fine-tuned, thus reducing computational burden and saving resources.

At operation 1310, the system obtains training data including training guidance information and a ground-truth image depicting a scene based on the training guidance information. For example, the machine learning model uses $c_{style}$, $c_{segmap}$, and $c_{sketch}$ as training guidance information. In some cases, the operations of this step refer to, or may be performed by, a training component as described with reference to FIG. 2.

At operation 1315, the system trains the conditioning network to modify predicted noise generated by a diffusion model, where the conditioning network is trained based on the training guidance information and the ground-truth image. In some cases, the operations of this step refer to, or may be performed by, a training component as described with reference to FIG. 2.

According to some embodiments of the present disclosure, the training component applies $L_1$ regularization to modulation parameters $\gamma$ and $\beta$ to ensure that the conditioning module C learns minimal perturbations to the noise $\varepsilon$. For example, L1 regularization loss refers to the absolute difference between the ground-truth and predicted values of modulation parameters. In some cases, the pre-trained diffusion model G is trained to predict noise $\varepsilon \sim N(0, I)$ which indicates a Gaussian distribution.

An embodiment of the present disclosure includes a Kullback-Leibler divergence to compute the statistical distance between two probability distributions. In some cases, the Kullback-Leibler divergence is given as $D_{KL}$ and computes the difference of predicted and ground-truth probability distributions. In some examples, a KL loss is applied on modified noise prediction $\varepsilon'$ such that the modified noise follows a standard Normal distribution.

According to some embodiments, the training component computes a perceptual loss term over the predicted denoised image. In some cases, the training component applies a perceptual loss which refers to a weighting scheme for the training objective that prioritizes learning from important noise levels. In some cases, minimal weights are assigned to the unnecessary stages. Accordingly, high weights are assigned to the remaining stages. Particularly, training is emphasized on the content stage to encourage the model to learn perceptually rich contexts. In some cases, the training component applies learned perceptual image patch similarity (LPIPS), a perceptual loss such that the conditioning module C does not learn adversarial perturbations that lead to non-photorealistic images.

Additionally, the training component computes individual modality losses, $\mathcal{L}_{seg}$, $\mathcal{L}_{sketch}$, and $\mathcal{L}_{style}$ over the predicted denoised image $x_0'$. Accordingly, the generated image captures the constraints specified by each of the input modalities. The final training objective $\mathcal{L}$ of the conditioning module C is formulated as follows:

$$\mathcal{L} = L_1(\gamma) + L_1(\beta) + D_{KL}(\varepsilon'\|\varepsilon) + LPIPS(x_0') + \mathcal{L}_{seg} + \mathcal{L}_{sketch} + \mathcal{L}_{style} \quad (3)$$

$\mathcal{L}_{seg}$ computes a cross-entropy loss using a non-textual modality information and training guidance information. In some cases, the non-textual modality information is based on the predicted output image 535, as described with reference to FIG. 5. For example, $\mathcal{L}_{seg}$ computes the cross-entropy loss between the logits of the predicted segmentation map of the predicted denoised image $x_0'$ from a pre-trained segmentation network and segmentation modality $C_{seg}$.

In some embodiments, $\mathcal{L}_{sketch}$ produces the edge map e of the predicted denoised image $x_0'$ using Canny edge detector. In some cases, $\mathcal{L}_{sketch}$ computes a distance transform v of edge map e. In some cases, $\mathcal{L}_{sketch}$ calculates the Chamfer distance between distance transform v and conditioning modality $C_{sketch}$ at the black pixel coordinates of $C_{sketch}$. For example, $\mathcal{L}_{sketch}$ computes a Chamfer distance function based on an additional non-textual modality information and the training guidance information. In some examples, the additional non-textual modality information is obtained based on the predicted output image 535, as described with reference to FIG. 5.

According to some embodiments, a style loss is used as an additional modality for training the conditioning network. In some examples, $\mathcal{L}_{style}$ is a VGG-based style loss. In some cases, a VGG loss is a type of content loss used for real-time style transfer and super-resolution and style transfer framework. The VGG loss is based on the ReLU activation layers of a pre-trained VGG network. For example, the style loss $\mathcal{L}_{style}$ computes the mean-squared error between the Gram matrices g and a of the predicted denoised image $x_0'$ and conditioning modality $C_{style}$, respectively.

The image processing apparatus applies a modality dropout technique during training to enable effective conditioning during sampling, even when some conditioning modalities are missing. Additionally, the machine learning model computes probability p, and replaces the value of $C_{segmap}$ Of $C_{sketch}$ with $-1$ so that the conditioning network C receives signals from both, either, or none of the two modalities during training. In some cases, when $C_{segmap}$ is dropped, the machine learning model omits (e.g., does not include) cross-entropy loss $\mathcal{L}_{segmap}$ from a final training objective $\mathcal{L}$. As shown in FIG. 7, when $c_{sketch}$ is dropped, the machine learning model omits Chamfer distance function $\mathcal{L}_{sketch}$ from the final training objective $\mathcal{L}$. In some cases, when both $c_{segmap}$ and $c_{sketch}$ are dropped, $\mathcal{L}_{segmap}$, $\mathcal{L}_{sketch}$, and perceptual loss LPIPS ($x_0'$) are omitted. Further details regarding the cross-entropy loss $\mathcal{L}_{segmap}$, Chamfer distance function $\mathcal{L}_{sketch}$, and final training objective $\mathcal{L}$ are provided in FIG. 13.

Figure 14:
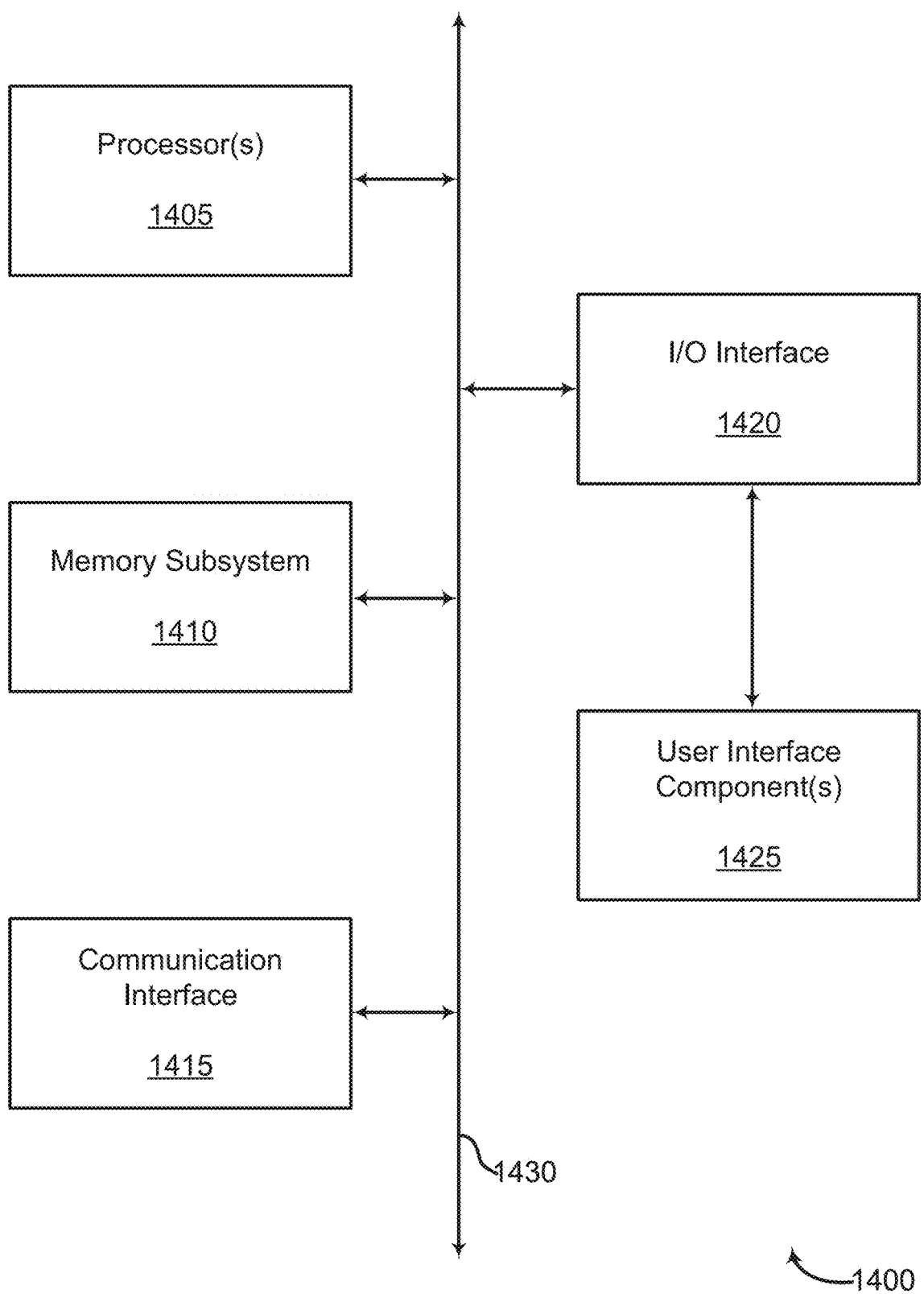
FIG. 14 shows an example of a computing device according to embodiments of the present disclosure.

FIG. 14 shows an example of a computing device 1400 according to embodiments of the present disclosure. The example shown includes computing device 1400, processor 1405, memory subsystem 1410, communication interface 1415, I/O interface 1420, user interface component 1425, and channel 1430.

In some embodiments, computing device 1400 is an example of, or includes aspects of, image processing apparatus 200 of FIG. 2. In some embodiments, computing device 1400 includes one or more processors 1405 that can execute instructions stored in memory subsystem 1410 for identifying a region of an image containing text; identifying a color of the text; and generating a modified image using a diffusion model based on the color of the text, wherein the modified image has a background color in the region of the image that contrasts with the color of the text.

According to some aspects, computing device 1400 includes one or more processors 1405. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1410 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1415 operates at a boundary between communicating entities (such as computing device 1400, one or more user devices, a cloud, and one or more databases) and channel 1430 and can record and process communications. In some cases, communication interface 1515 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1420 is controlled by an I/O controller to manage input and output signals for computing device 1400. In some cases, I/O interface 1420 manages peripherals not integrated into computing device 1400. In some cases, I/O interface 1420 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1420 or via hardware components controlled by the I/O controller.

According to some aspects, user interface component(s) 1425 enable a user to interact with computing device 1400. In some cases, user interface component(s) 1425 include an audio device, such as an external speaker system, an external display device such as a display screen, an input device (e.g., a remote-control device interfaced with a user interface directly or through the I/O controller), or a combination thereof. In some cases, user interface component(s) 1425 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
   obtaining a noise input and guidance information indicating a target image control;
   generating, using an image generation model, a noise prediction based on the noise input, wherein the noise prediction comprises a prediction of noise to remove from the noise input;
   generating noise modulation parameters based on the guidance information using a conditioning network, wherein the noise modulation parameters represent the target image control;
   combining the noise prediction and the noise modulation parameters to obtain a modified noise prediction, wherein the modified noise prediction comprises a modified prediction of noise to remove from the noise input based on the target image control; and
   generating, using the image generation model, a synthetic image based on the modified noise prediction, wherein the synthetic image depicts a scene based on the target image control.

2. The method of claim 1, wherein:
   the guidance information comprises non-textual guidance.

3. The method of claim 1, wherein:
   the guidance information comprises an additional modality other than a training modality used for training the image generation model.

4. The method of claim 1, wherein:
   the guidance information comprises multiple modalities.

5. The method of claim 1, wherein the combining comprises:
   performing element-wise multiplication of the noise prediction and a first portion of the noise modulation parameters; and
   performing element-wise addition of the noise prediction and a second portion of the noise modulation parameters.

6. The method of claim 1, further comprising:
   iteratively generating a plurality of intermediate noise predictions corresponding to a plurality of diffusion steps, respectively; and
   iteratively generating a plurality of noise modulation parameters corresponding to the plurality of intermediate noise predictions, respectively, wherein the synthetic image is generated based on the plurality of noise modulation parameters.

7. The method of claim 1, further comprising:
   generating an intermediate image prediction, wherein the noise modulation parameters are generated based on the intermediate image prediction.

8. The method of claim 7, further comprising:
   generating a subsequent image prediction based on the intermediate image prediction and the modified noise prediction, wherein the synthetic image is generated based on the subsequent image prediction.

9. An apparatus comprising:
a memory component;
a processing device coupled to the memory component, the processing device configured to perform operations comprising:
obtaining a noise input and guidance information indicating a target image control;
generating, using an image generation model, a noise prediction based on the noise input, wherein the noise prediction comprises a prediction of noise to remove from the noise input;
generating noise modulation parameters based on the guidance information using a conditioning network, wherein the noise modulation parameters represent the target image control;
combining the noise prediction and the noise modulation parameters to obtain a modified noise prediction, wherein the modified noise prediction comprises a modified prediction of noise to remove from the noise input based on the target image control; and
generating, using the image generation model, a synthetic image based on the modified noise prediction, wherein the synthetic image depicts a scene based on the target image control.

10. The apparatus of claim 9, wherein:
the image generation model comprises a U-Net architecture, wherein the noise modulation parameters are applied to an output of the U-Net architecture of the image generation model.

11. The apparatus of claim 9, wherein:
the image generation model comprises a text-guided diffusion model, and the image generation model takes a text prompt as an input.

12. The apparatus of claim 9, wherein:
the conditioning network comprises a U-Net architecture, wherein the noise modulation parameters comprise an output of the U-Net architecture of the conditioning network.

13. A non-transitory computer readable medium storing code for video processing, the code comprising instructions that, when executed by at least one processor, cause the at least one processor to perform operations comprising:
obtaining a noise input and guidance information indicating a target image control;
generating, using an image generation model, a noise prediction based on the noise input, wherein the noise prediction comprises a prediction of noise to remove from the noise input;
generating noise modulation parameters based on the guidance information using a conditioning network, wherein the noise modulation parameters represent the target image control;
combining the noise prediction and the noise modulation parameters to obtain a modified noise prediction, wherein the modified noise prediction comprises a modified prediction of noise to remove from the noise input based on the target image control; and
generating, using the image generation model, a synthetic image based on the modified noise prediction, wherein the synthetic image depicts a scene based on the target image control.

14. The non-transitory computer readable medium of claim 13, wherein:
the guidance information comprises non-textual guidance.

15. The non-transitory computer readable medium of claim 13, wherein:
the guidance information comprises an additional modality other than a training modality used for training the image generation model.

16. The non-transitory computer readable medium of claim 13, wherein:
the guidance information comprises multiple modalities.

17. The non-transitory computer readable medium of claim 13, the code further comprising instructions executable by the at least one processor to perform operations comprising:
performing element-wise multiplication of the noise prediction and a first portion of the noise modulation parameters; and
performing element-wise addition of the noise prediction and a second portion of the noise modulation parameters.

18. The non-transitory computer readable medium of claim 13, the code further comprising instructions executable by the at least one processor to perform operations comprising:
iteratively generating a plurality of intermediate noise predictions corresponding to a plurality of diffusion steps, respectively; and
iteratively generating a plurality of noise modulation parameters corresponding to the plurality of intermediate noise predictions, respectively, wherein the synthetic image is generated based on the plurality of noise modulation parameters.

19. The non-transitory computer readable medium of claim 13, the code further comprising instructions executable by the at least one processor to perform operations comprising:
generating an intermediate image prediction, wherein the noise modulation parameters are generated based on the intermediate image prediction.

20. The non-transitory computer readable medium of claim 19, the code further comprising instructions executable by the at least one processor to perform operations comprising:
generating a subsequent image prediction based on the intermediate image prediction and the modified noise prediction, wherein the synthetic image is generated based on the subsequent image prediction.

* * * * *